US005771917A

United States Patent [19]

Carney et al.

[11] Patent Number: 5,771,917

[45] Date of Patent: Jun. 30, 1998

[54] SANITARY ASEPTIC DRAIN SYSTEM

[75] Inventors: Michael Carney, Kenosha; Richard D. Kramer, Racine, both of Wis.

[73] Assignee: Tri-Clover, Inc., Kenosha, Wis.

[21] Appl. No.: 533,612

[22] Filed: Sep. 25, 1995

[51] Int. Cl.[6] .............................. B08B 9/06; B08B 9/08; F16K 31/02

[52] U.S. Cl. ........................ 137/238; 134/95.1; 134/98.1; 134/99.1; 134/166 C; 134/171; 137/240; 137/392; 137/558; 137/587; 141/85; 222/64; 222/148; 340/620

[58] Field of Search .................................... 137/238, 240, 137/392, 549, 550, 558, 587; 73/304 R, 304 C; 134/94.1, 95.1, 98.1, 99.1, 166 C, 171; 141/85; 222/52, 64, 148; 307/118; 340/620; 361/178

[56] References Cited

U.S. PATENT DOCUMENTS

| | | | |
|---|---|---|---|
| 246,193 | 8/1881 | O'Grady | 137/247.33 |
| 901,859 | 10/1908 | Williams | 137/247.33 |
| 1,034,505 | 8/1912 | Podolsky | 137/247.33 |
| 3,214,643 | 10/1965 | Borell | 137/392 |
| 3,279,379 | 10/1966 | Klyce | 137/392 |
| 3,671,142 | 6/1972 | Calabrese | 137/392 |
| 3,714,956 | 2/1973 | Nelson | 137/238 |
| 3,951,184 | 4/1976 | Rechsteiner . | |
| 4,186,849 | 2/1980 | Spangler | 137/392 |
| 4,347,877 | 9/1982 | Hoiss | 137/238 |
| 4,623,516 | 11/1986 | Weiler et al. . | |
| 4,874,021 | 10/1989 | Ringdahl et al. | 137/238 |
| 5,152,500 | 10/1992 | Hoobyar et al. | 137/240 |
| 5,232,023 | 8/1993 | Zimmerly | 137/240 |
| 5,275,201 | 1/1994 | Zimmerly | 137/454.6 |

FOREIGN PATENT DOCUMENTS

WO94/24037 10/1994 WIPO .

*Primary Examiner*—George L. Walton
*Attorney, Agent, or Firm*—Ryan, Maki, Mann & Hohenfeldt

[57] ABSTRACT

A buffer system for separating an aseptic fluid handling assembly from a drain includes a fluid receiving housing in fluid flow communication with a fluid discharge outlet of the aseptic fluid handling assembly. A trapped fluid discharge opening near the bottom of the housing, includes a tube which extends above the bottom into a baffle container. The baffle container is in the form of an enclosure having openings at the bottom thereof to admit fluids contained in the housing. A discharge conduit is in fluid flow communication with the discharge opening. A first fluid level detector in the housing activates at least one valve in the discharge conduit by a control which opens and closes the valve in response selected fluid levels detected by the fluid level detector. In a preferred embodiment the first fluid level detect detects a fluid level exceeding a preselected depth in the housing and a second fluid level detector detects fluid levels dropping below a second preselected level in the housing. Preferably the second fluid level detector is operatively connected to the valve to cause closing thereof in the event the fluid level drops below the second preselected level.

14 Claims, 3 Drawing Sheets

SANITARY ASEPTIC DRAIN SYSTEM

FIELD OF THE INVENTION

This invention relates to systems for aseptically connecting fluid processing lines, such as those used in food processing or sterile drug production, to drain lines. More specifically, the invention relates to such systems which provide an aseptic barrier between a drain line open to the atmosphere and an aseptic process system.

BACKGROUND OF THE INVENTION

Various fluid handling systems have been devised for transferring fluids such as foods from multiple sources to multiple product delivery tubes connected to outlets such as container filling stations as well as other enclosed type of systems that may require connection to a drain. See, for example, commonly assigned, Zimmerly, U.S. Pat. Nos. 5,226,449; 2,232,023; and 5,275,201. Applicable regulations require that the valves used in such systems be provided with a means to drain them to the atmosphere and to provide a device that serves as a leak detector indicating that a malfunction has occurred in the system.

Processes and packaging have been developed for long term storage of aseptically packaged products such as milk, baby formula, juices, and IV solutions. The problem exists, however, that there is always some possibility that contaminants from an atmospheric drain system could move upstream into the fluid handling system in the absence of a barrier. However, to comply with the necessity of providing leak detection, systems have not been available for serving as a sanitary barrier.

SUMMARY OF THE INVENTION

The principal object of the present invention is to provide a sanitary barrier between a drain system open to the atmosphere and an aseptic fluid handling system such as the type used in transferring food liquids. In accordance with an important aspect of the invention, a liquid solution overflow barrier is provided as a component of the barrier system of the invention. In accordance with a further aspect of the invention, controllable valves are utilized which are connected to sensors which maintain the barrier solution between selected high and low fluid levels. In accordance with a related aspect of the invention, the probes detect a low barrier fluid level condition and sound an appropriate alarm.

In accordance with yet further aspects of the invention, air pressure equalization openings are provided which cause any necessary air to enter the system through sterile filters. In a still further related aspect of the invention the exit vents also utilize sterile vent filters. In accordance with a still further aspect of the invention, provision is made for rinsing of the entire system with clean-in-place fluid which is drained from the system through the barrier assembly of the present invention.

In accordance with a yet further aspect of the invention, the assembly, further, is connected to a steam supply valve which allows sterilization of the system with steam and also provides for collection and removal of steam condensate.

In accordance with another further aspect of the invention, a warning system is provided to indicate a high fluid level which can thus signal that a valve plug or seal has failed, possibly allowing large amounts of product solution to enter the barrier assembly. In accordance with a further related aspect of the high level warning system, a mechanism is provided to permit drainage to occur through the barrier area until the malfunction has been remedied.

Briefly, a buffer system for separating an aseptic fluid handling assembly from a drain includes a fluid receiving housing in fluid flow communication with a fluid discharge outlet of the aseptic fluid handling assembly. A trapped fluid discharge opening near the bottom of the housing, includes a tube which extends above the bottom into a baffle container. The baffle container is in the form of an enclosure having openings at the bottom thereof to admit fluids contained in the housing. A discharge conduit is in fluid flow communication with the discharge opening. A first fluid level detector in the housing activates at least one valve in the discharge conduit by a control which opens and closes the valve in response selected fluid levels detected by the fluid level detector. In a preferred embodiment the first fluid level detect detects a fluid level exceeding a preselected depth in the housing and a second fluid level detector detects fluid levels dropping below a second preselected level in the housing. Preferably the second fluid level detector is operatively connected to the valve to cause closing thereof in the event the fluid level drops below the second preselected level.

Further objects and advantages of the invention will become apparent through the accompanying detailed description, claims and accompanying drawings.

DETAILED DESCRIPTION OF PREFERRED EMBODIMENTS

Figure 2:
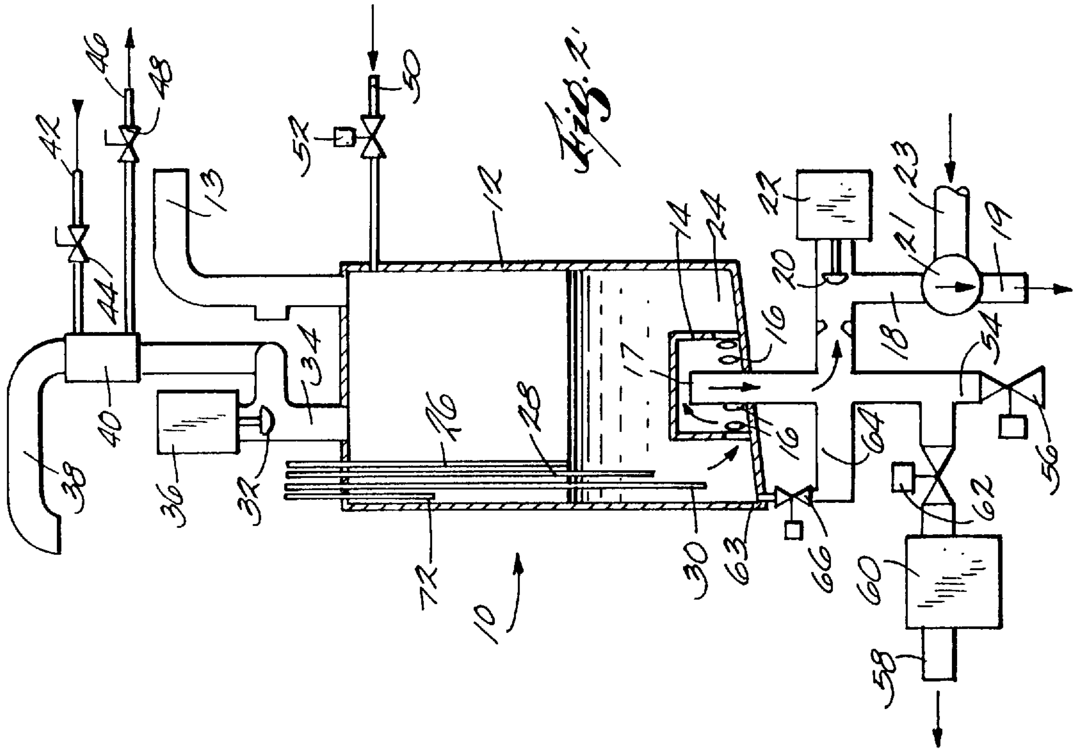
FIG. 2 is a partially schematic drawing of a sanitary aseptic drain system in accordance with invention showing parts in cross-section with the system in a draining mode.

Referring more particularly to the drawings there is seen in each FIGURE of the drawings a buffer system generally identified by numeral 10 for providing an aseptic connection between fluid processing conduits and drain lines. The buffer systems 10 of this invention includes a housing 12 adapted to receive fluids from a system drain 13 which connects, for example to a manifold valve assembly of the type shown in U.S. Pat. Nos. 5,232,023 or 5,275,201. Such systems are provided with valves known as “leak detector” valves which discharge liquids to a drain in the event of leakage of one or more valves within the system.

Within the bottom portion of housing 12 is a trap hood 14 provided with fluid flow openings 16 near its bottom. An outflow pipe 17 extends into housing 12 to a height located above the top of openings 16 and within trap hood 14. This arrangement thereby forms a liquid flow trap. Outflow pipe 17 is connected to further outflow conduit sections 18 and 19 which lead to a drain. A valve 20 controllable by a air valve controller 22 separates conduit sections 17 and 18. A two way valve 21 separates drain conduit section 18 from the lower portion of the conduit 19 which, in turn, is connected to a drain. The two way valve 21 also can divert backflow of liquids under pressure into the system through a pipe 23 which is adapted to permit inflow therethrough of a clean-in-place fluid.

A volume of liquid 24 separates the housing 12 from the drain system 17, 18, 19. It will be noted, referring to the drawings, that the upward flow of liquids from the drain is prevented by the trap system as illustrated.

To insure that overflow tube 17 is always covered by liquid a series of level control probes 26, 28 and 30 are provided. Probe 26 is a high level probe, probe 28 is a static system level probe and probe 30 is a low level probe, the function of each of which is further explained hereinbelow.

Housing 12 is also provided at its upper end with a vent outlet 34 which is controlled by valve 32 operated by an air valve controller 36. The outflow vent 34 is connected to a vent stack by means of connecting pipe 38. A steamable vent filter 40 is provided in vent line 38 to permit steam sterilization thereof. A steam inflow pipe 42, controllable by valve 44, and a steam outflow pipe 46 exiting from the filter casing, controllable by a valve 48, are also provided for purposes of sterilization of filter 40.

Housing 12 is also provided with a steam inflow pipe 50 controllable by an air valve 52 to permit steam cleaning of the housing 12.

The housing 12 and the associated parts of buffer system 10 are provided with a system drain 54 controllable by an air valve 56. Also connected to the system is a steam condensate outflow conduit 58 which provides a means for outflow of steam condensate from a steam trap 60 which is separated from system 10 by means of another air valve 62.

As seen in the drawings the bottom of housing 12 is preferably inclined so that a drain opening 63 connected by pipe 64 to the system drain 54 can drain all of the liquid contained in the bottom of housing 12 by means of gravity flow. An air valve 66 closes outlet 63 and is normally closed during operation of the system.

Operation

Figure 1:
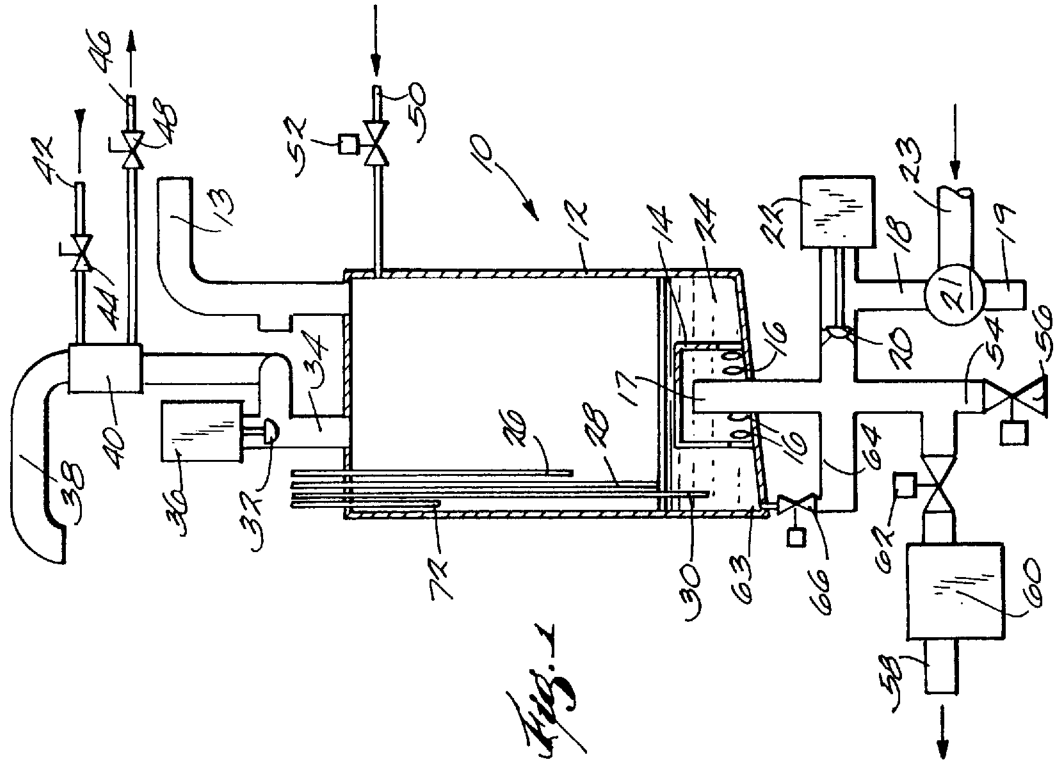
FIG. 1 is a partially schematic drawing showing a sanitary aseptic drain system in accordance with invention with parts in cross-section and with the system in a static mode.

The operation of the system in various operational modes will now be discussed with reference to the drawings. Referring first to FIG. 1 which shows the system in a static operational mode which provides a barrier between product drain line 13 and drain pipe connector 19, the housing 12 is filled, preferably to the level of probe number 28, with a liquid solution, which is at a greater depth than outflow pipe 17 and thus creates a barrier.

Referring to FIG. 2 the system draining mode is illustrated. In the event that liquids from the system enter housing 12 through conduit 13 the fluid level in housing 12 is allowed to increase until the level of probe 26 is reached. Probe 26 is electrically connected to controller 22 which causes air valve 20 to open. Valve 21 opens the connection between conduit segments 18 and 19. Liquids from housing 12 are thus enabled to flow into the product drain out of conduit 19 as the arrows show in FIG. 2. As the fluid level in housing 12 increases, air in housing 12 is displaced outwardly through vent outlet 34 and conduit 38. At any time that the liquid reaches the level of probe 26, outflow of liquid continues until the level of probe 28 is once again reached. At that level air valve 20 is caused, by signals triggered by probe 28, to close, thereby maintaining the fluid level at probe 28 which is at a level above outflow pipe 17. In the event that the fluid level 24 drops below the level of probe 30 an alarm will sound indicating that a low level condition has been exceeded.

Figure 3:
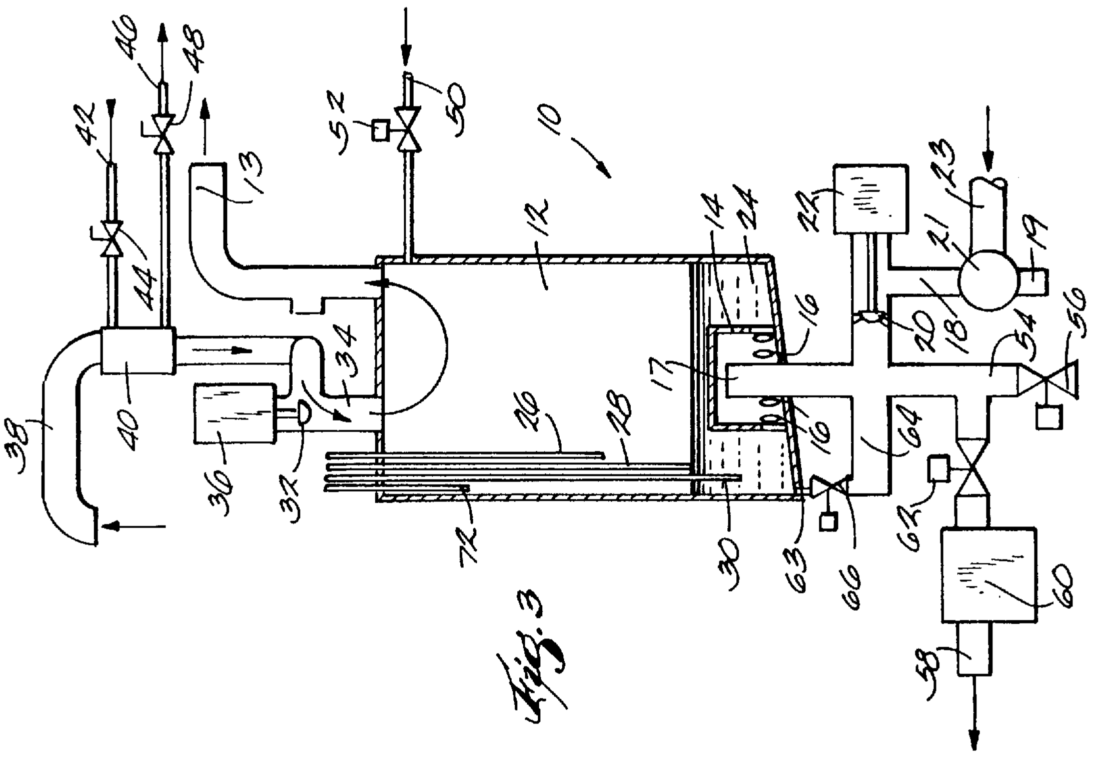
FIG. 3 is a partially schematic drawing of a sanitary aseptic drain system in accordance with invention showing parts in cross-section with the system in a vent mode.

In order to prevent creation of a vacuum in the system, air is permitted to be introduced into housing 12 through sterile vent filter 40 and then through opening 34. The system venting condition is best seen in FIG. 3 wherein the flow of air through housing 12 and back through product flow conduit 13 into the manifold system is indicated. This condition will continue so long as negative pressure occurs within the manifold valve system.

Figure 4:
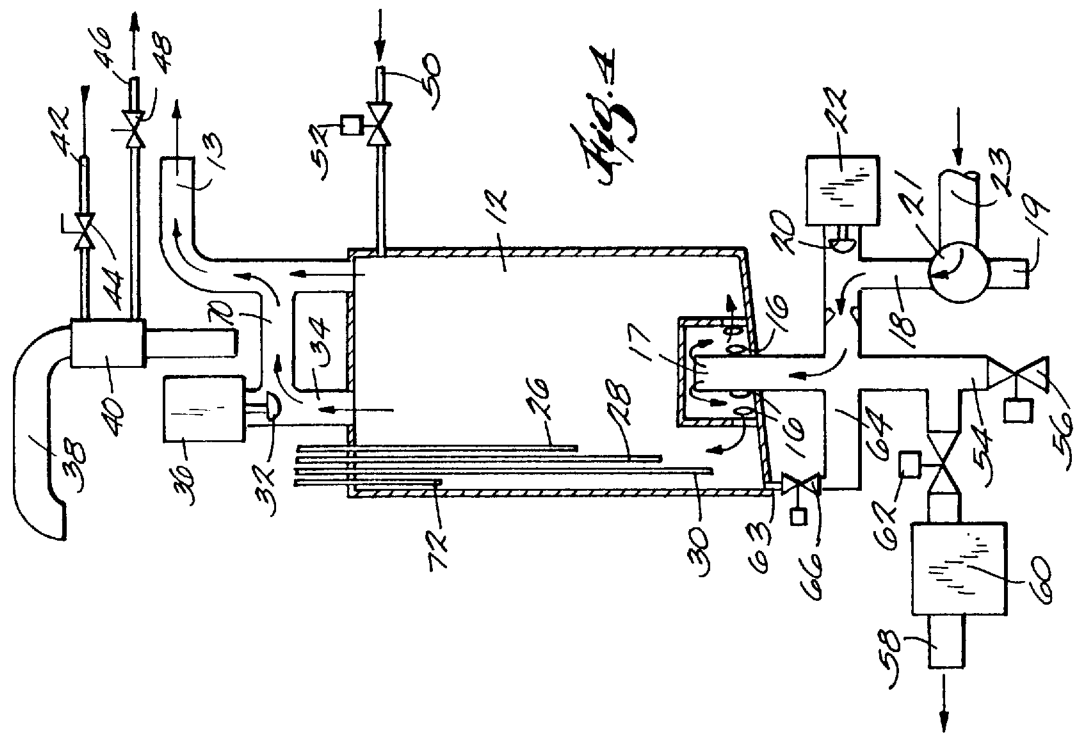
FIG. 4 is a partially schematic drawing of a sanitary aseptic drain system in accordance with invention showing parts in cross-section with the system in a clean-in-place mode.

The arrangement for cleaning-in-place of the system is illustrated in FIG. 4. When cleaning of the manifold valve system is called for, as seen in FIG. 4 clean-in-place solution enters through conduit 23. Valve 21 directs the flow of clean-in-place fluid upwardly through conduit 18 and through overflow pipe 17. For this purpose air valve 20 is opened by air valve controller 22. As noted by the arrows in FIG. 4 clean-in-place solution also flows upwardly through conduit 13 and preferably through conduit 34 and therefrom by means of an appropriate crossover conduit 70 into the manifold system.

Figure 5:
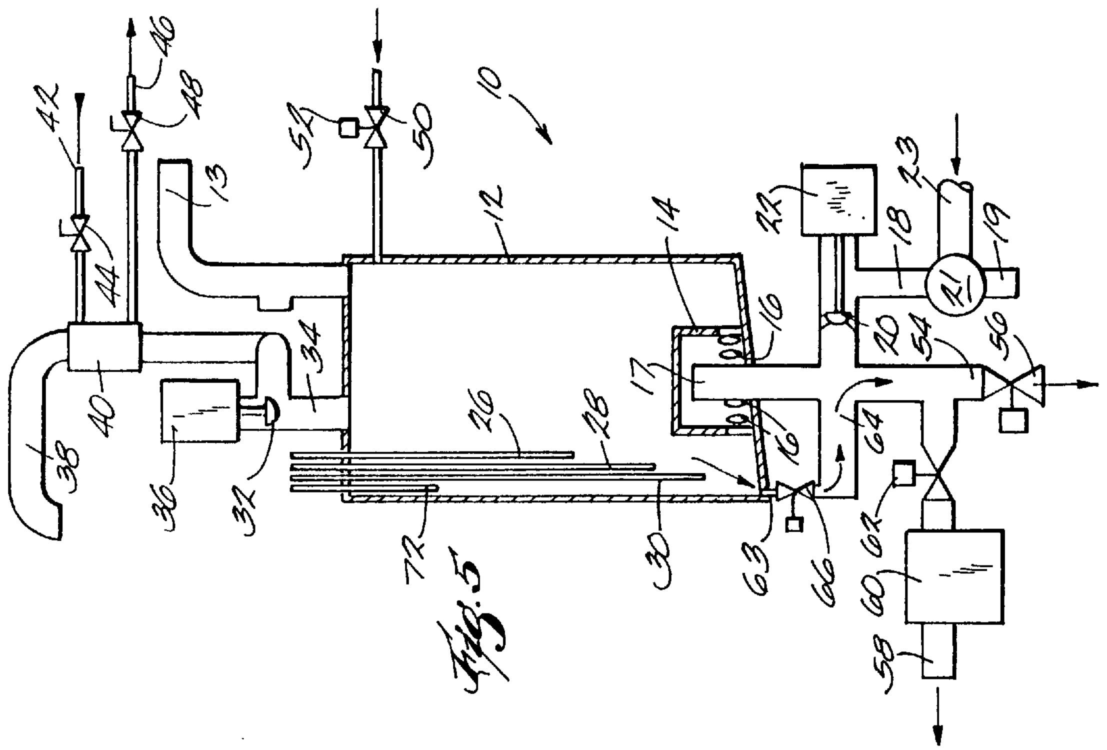
FIG. 5 is a partially schematic drawing of a sanitary aseptic drain system in accordance with invention showing parts in cross-section with the system in a mode for draining cleaning solution therefrom.

Draining of the clean-in-place fluid out of the system after cleaning is illustrated in FIG. 5. Note that outflow valve 63 is at a lower vertical level than the remainder of housing 12. In order to drain the spent clean-in-place solution, valve 66 is opened as is valve 54 so that the clean-in-place fluid can flow out through outlet 63 and conduits 64 and 54 as indicated by arrows. Two way valve 21 closes the clean-in-place supply conduit 23. Air valve controller 22 also closes valve 20. Optionally valve 62 can also be opened to permit fluid drainage out of conduit 58.

Figure 6:
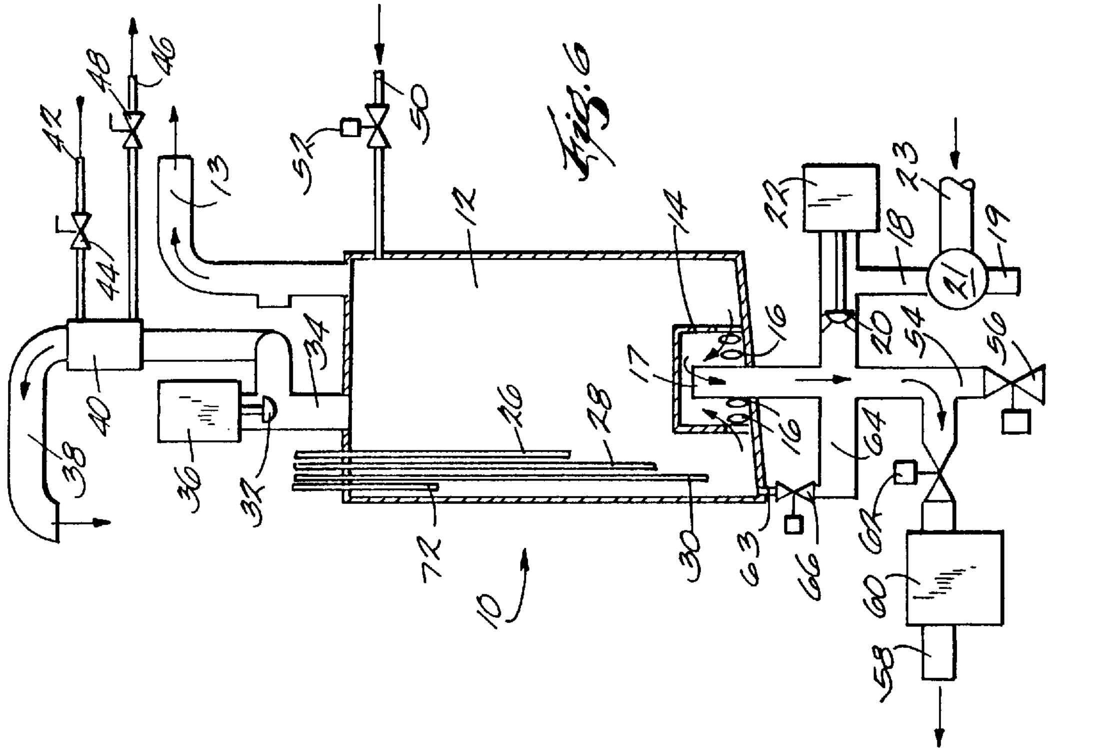
FIG. 6 is a partially schematic drawing of a sanitary aseptic drain system in accordance with invention showing parts in cross-section with the system in a steam cleaning mode.

Referring to FIG. 6 the operation of the system during system steaming is shown. During steaming air valve controller 52 is activated to open thus allowing steam to flow in through steam inlet conduit 50. Steam then flows through the system in the direction of the various arrows seen in FIG. 6. During steaming it is desirable to pulse valve 36 periodically in order to steam the valve cavity of said valve and to allow steam to enter the vent tube and exit the vent stack. During this procedure valve 36 is normally closed and only opened periodically to allow steam through the vent piping system. As noted, steam will backflow into the manifold system through conduit 13 and flow outwardly through outflow pipe 17 and into steam trap 60 and then flow out as condensate through outlet 58. Generally it is preferred that as condensate forms it is collected within housing 12 until it rises to the level of probe 26. When the condensate reaches probe 26 air valve 62 is opened to allow condensate and remaining steam to flow through steam trap 60. At the end of the steam cycle the condensate is drained to the level of probe 28 at which time valve 62 is closed. Thus a liquid barrier is provided completely covering outflow tube 17 in an aseptic fashion. Preferably the steam utilized is of culinary quality, ie: it has been filtered to remove any boiler materials.

It is preferred that the system also be provided with protection against catastrophic failure, for example, in the event that a seal or valve plug should fail somewhere in the associated piping matrix, thus allowing the flow into housing 12 of a large amount of product solution and thereby overcoming the normal draining of the system. In this event, if the solution rises to probe 72, indicating an undesirably high liquid level condition, air valve 36 is activated to close, thereby protecting the vent filter area from being contaminated with product solution. Also at this point controls would be interlocked to a product high level alarm which would alert an operator that system failure has occurred. Under this condition the system would continue draining through valve 20 and outflow conduit 19 until a level coinciding with probe 28 was attained thus triggering the closing of valve 20 by means of air valve controller 22. The barrier within housing 12 would thus continue to be maintained.

While various preferred embodiments of the invention have been shown for purposes of illustration it will be understood that modifications can be made by those skilled in the art. Thus the scope of the invention should be deemed to include the literal language of the appended claims and reasonable equivalents thereof.

What is claimed is:

1. A buffer system for separating an aseptic fluid handling assembly from a drain comprising a fluid receiving housing in fluid flow communication with a fluid discharge outlet of said aseptic fluid handling assembly a trapped fluid discharge opening near the bottom of said housing, said opening including a tube which extends above said bottom into a baffle container, said baffle container being in the form of an enclosure having openings at the bottom thereof to admit therein fluids contained in said housing and preventing back flow of fluids from said drain, a discharge conduit in fluid flow communication with said discharge opening said discharge opening being in fluid flow communication with said drain, first and second fluid level detection means in said housing for detecting high and low fluid levels in said housing, respectively, both of said high and low levels being above said openings of said enclosure, at least one valve in said discharge conduit, control means operatively connected to said first and second fluid level detection means to open and close said valve in response selected fluid levels detected by said first fluid level detection means, whereby a fluid level in said housing is controlled in a preselected depth range above the level of said openings of said enclosure during a static operational mode, said first fluid level detection means being operatively connected to a drain valve to open said valve to provide a draining mode of said system when said high fluid level is exceeded, a supply of clean-in-place fluid being connected to said entire buffer system by a conduit having a valve to selectively enable control of flow of said clean-in-place fluid into said entire buffer system during a cleaning mode of operation and to selectively enable discontinuation of said flow of said clean-in-place fluid after said entire buffer system has been cleaned.

2. A system according to claim 1 wherein said first fluid level detection means is provided to detect a fluid level exceeding a preselected depth in said housing and a second fluid level detector is provided to detect a fluid level dropping below a second preselected level in said housing.

3. A system according to claim 2 wherein said second fluid level detector is operatively connected to said valve to cause closing thereof in the event said fluid level drops below said second preselected level.

4. A system according to claim 1 wherein a source of steam is provided, said source of steam being connected to said housing through a conduit, said conduit being provided with a control valve to enable opening and closing of said conduit.

5. A buffer system for separating an aseptic liquid handling assembly from a drain comprising a liquid receiving housing in fluid flow communication with a discharge outlet of said aseptic liquid handling assembly a trapped liquid discharge opening near the bottom of said housing, said opening including a tube which extends above said bottom into a baffle container, said baffle container being in the form of an enclosure having openings at the bottom thereof to admit therein liquids contained in said housing and preventing back flow of fluids from said drain, a discharge conduit in fluid flow communication with said discharge opening, a first low liquid level detection means for detecting dropping of a liquid level in said housing below the elevation of said first detection means, said low liquid level being at an elevation above said openings of said enclosure, a second liquid level detection means for detecting the rise of a liquid level in said housing above the elevation of said second detection means, at least one valve in said discharge conduit, and control means to open and close said valve in response selected liquid levels detected by said first and second liquid level detection means, whereby said valve is closed in response to detection of a liquid level below said first detection means and opened in response to detection of a liquid level above said second detection means, a second discharge conduit in fluid flow communication with said housing, said second discharge conduit having a second valve operatively connected to said second liquid level detection means to selectively open said second valve a supply of clean-in-place fluid being connected to said housing by a conduit having a valve to enable control of flow of said clean-in-place fluid into said housing during a cleaning mode of operation and to enable discontinuation of said flow of said clean-in-place fluid after said entire buffer system has been cleaned, and a source of steam connected to said entire buffer system through a conduit, said conduit being provided with a control valve to enable opening and closing of said conduit for steam cleaning of said entire buffer system.

6. A buffer system according to claim 5 wherein a vacuum relief opening is provided connecting said housing to the atmosphere.

7. A system according to claim 6 wherein a steam sterilizable filter is provided in a conduit connecting said housing to said vacuum relief opening.

8. A system according to claim 7 wherein said connecting conduit is also connected to a source of steam and a valve is provided for closing the vacuum relief opening when said steam conduit is open.

9. A system according to claim 8 wherein a separate drain conduit attached to said housing connects said housing to a steam condenser.

10. A system according to claim 5 wherein a conduit provided with a valve connects said housing to a source of clean-in-place fluid.

11. A system according to claim 10 wherein said latter conduit is connected to said outlet pipe and a two-way valve directs flow alternately connecting said housing to said drain or to said clean-in-place fluid source.

12. A system according to claim 5 further provided with a low level alarm, said alarm being operatively connected to a liquid level detecting probe in said housing, actuatable by dropping of the liquid level in said housing to a level below said probe.

13. A system according to claim 12 wherein said housing contains a high level probe, said high level probe providing notification of catastrophic high level liquid levels within said housing, said probe being operatively connected to a control which is provided to close off connection between said aseptic fluid handling assembling with said housing.

14. A system according to claim 5 wherein said housing is provided with a bottom surface which contains a valved separate drain outlet, said bottom panel sloping toward said outlet.

* * * * *